US005363358A

United States Patent [19]

Yanagawa

[11] Patent Number: 5,363,358
[45] Date of Patent: Nov. 8, 1994

[54] OPTICAL DISC APPARATUS WITH SELECTION OF THREE-BEAM AND PUSH-PULL SYSTEMS

[75] Inventor: Naoharu Yanagawa, Tokorozawa, Japan

[73] Assignee: Pioneer Electronic Corporation, Tokyo, Japan

[21] Appl. No.: 155,700

[22] Filed: Nov. 23, 1993

[30] Foreign Application Priority Data

Nov. 24, 1992 [JP] Japan .................. 4-313619

[51] Int. Cl.⁵ .................................. G11B 7/095
[52] U.S. Cl. ........................ 369/44.29; 369/44.34; 369/44.35; 369/44.37; 369/58
[58] Field of Search ............ 369/44.25, 44.26, 44.29, 369/44.31-44.32, 44.34-44.35, 44.37, 44.38, 54.58

[56] References Cited

U.S. PATENT DOCUMENTS

| | | | |
|---|---|---|---|
| 4,787,076 | 11/1988 | Deguchi et al. | 369/44.37 X |
| 5,079,757 | 1/1992 | Wachi et al. | 369/44.35 X |
| 5,173,886 | 12/1992 | Satoh et al. | 369/44.29 X |
| 5,202,873 | 4/1993 | Ito et al. | 369/44.35 X |
| 5,212,675 | 5/1993 | Yoshino et al. | 369/44.37 X |
| 5,268,883 | 12/1993 | Yamaguchi et al. | 369/44.29 X |

OTHER PUBLICATIONS

Patent Abstracts of Japan, vol. 17, No. 141, (P1506), Mar. 23, 1993, & JP04-313819.

*Primary Examiner*—W. R. Young
*Attorney, Agent, or Firm*—Sughrue, Mion, Zinn, Macpeak & Seas

[57] ABSTRACT

An optical disc apparatus continues the tracking operation even if a pickup reaches an unrecorded portion of a disc during the reproduction of an information signal. The apparatus discriminates whether the reading position of the pickup is at the recorded part or the unrecorded part according to a result of a comparison using a signal level read out, by the pickup, from a region other than a predetermined region. In accordance with the result of the discrimination, the tracking servo operation is switched to either one of a three-beam system and a push-pull system.

2 Claims, 6 Drawing Sheets

OPTICAL DISC APPARATUS WITH SELECTION OF THREE-BEAM AND PUSH-PULL SYSTEMS

BACKGROUND OF THE INVENTION

1. Field of the Invention

The invention relates to an optical disc apparatus for recording an information signal such as a video signal or the like on an optical disc and for reproducing the recorded signal.

2. Description of Background Information

An optical disc apparatus is provided with a tracking servo apparatus to accurately read out the signal recorded on tracks of an optical disc by a pickup. As a system of realizing the tracking servo apparatus, there are generally a three-beam system and a push-pull system.

According to the three-beam system, a main beam spot to be located on track and two sub beam spots are formed in a manner that the sub-beams are arranged obliquely and symmetrically in front and rear, respectively, of the main beam spot as a center of symmetry. The amounts of reflection light of the two sub beam spots are detected by photodetectors, a difference between the reflection light amounts is generated as a tracking error signal, and an objective lens is controlled so as to trace the track in accordance with the tracking error signal.

According to the push-pull system, a reflection light amount by one beam spot to be located on the track is detected by a split photodetector (split into two halves) and a difference between outputs of the two detector halves is generated as a tracking error signal.

In an optical disc apparatus capable of the reproduction only, a tracking servo apparatus of the three-beam system is generally used because the stable operation is obtained. On the other hand, in case of a recordable optical disc apparatus, since three operating modes for recording, reproducing, and erasing are executed, the push-pull system is used as a system for tracking servo because a level fluctuation of the tracking error signals when no signal is recorded and after the signal was recorded is small in each operating mode.

Figure 1:
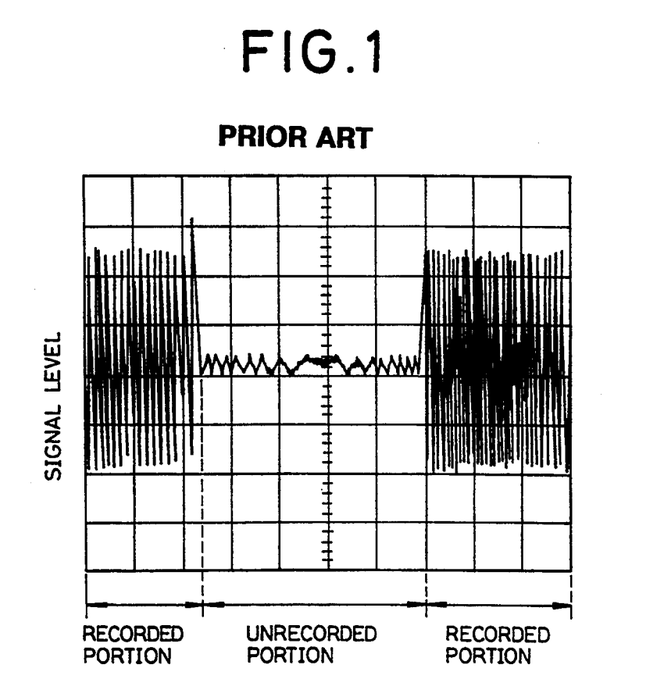
FIG. 1 is a diagram showing a tracking error signal amplitude according to the three-beam system for a recorded portion and an unrecorded portion.

Since the tracking error signal by the three-beam system represents the light and dark states of the reflected light, a signal amplitude is extremely small for the unrecorded portion of the disc as shown in FIG. 1. In the reproduction only optical disc apparatus having the tracking servo apparatus of the three-beam system, there is a problem such that when the pickup reaches the unrecorded portion of the disc, no servo loop is formed because the amplitude of the tracking error signal suddenly decreases and the beam spot by the pickup rush away.

In case of writing or reading the data which was managed on the disc on a sector unit basis, a possibility such that the pickup reaches the unrecorded portion is small. In over writing type recording operation, in case of handling continuous data as an information signal, there is a possibility such that an unrecorded portion occurs in a junction portion with the portion in which the signal has already been recorded.

OBJECT AND SUMMARY OF THE INVENTION

It is an object of the invention to provide an optical disc apparatus which can avoid the loss of position control of the beam spot even if a pickup reaches an unrecorded portion on a disc during the reproduction of an information signal.

According to the present invention, there is provided an optical disc apparatus for recording an information signal onto an optical disc and for reproducing the recorded information signal, wherein the apparatus comprises: recording means for recording a level setting signal indicative of a recording level into a predetermined region of the disc when information signal to be recorded is recorded on the disc; memory means for reading out the level setting signal from the predetermined region by a pickup when the information signal recorded on the disc is reproduced and for storing the level setting signal; comparing means for comparing a signal level read out from a region other than the predetermined region of the disc by the pickup and the level setting signal stored in the memory means; and tracking servo means for selectively performing the tracking servo operation of either one of a three-beam system and a push-pull system in accordance with a result of the comparison by the comparing means.

According to the optical disc apparatus of the invention, a recording level of a disc is preset and on the basis of the signal level read out from a region other than the predetermined region of the disc by the pickup, discrimination as to whether the reading position of the pickup is a recorded portion or an unrecorded portion is performed by the comparing means, and the tracking servo operation is switched to either one of the operations of three-beam system and the push-pull system in accordance with the result of the discrimination.

DETAILED DESCRIPTION OF THE EMBODIMENT

An embodiment of the invention will now be described in detail hereinbelow with reference to the drawings.

Figure 2:
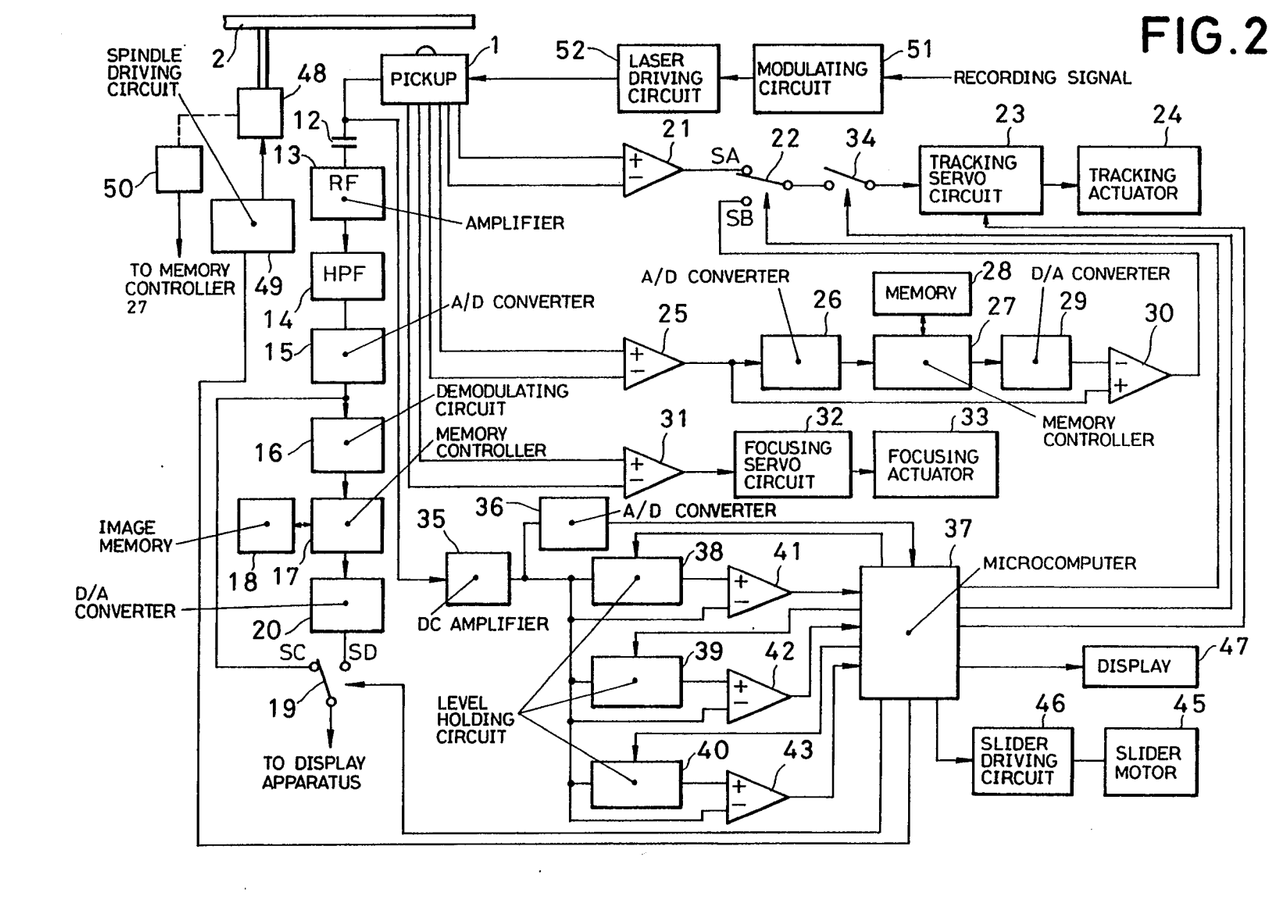
FIG. 2 is a block diagram showing an embodiment of the invention.
Figure 3:
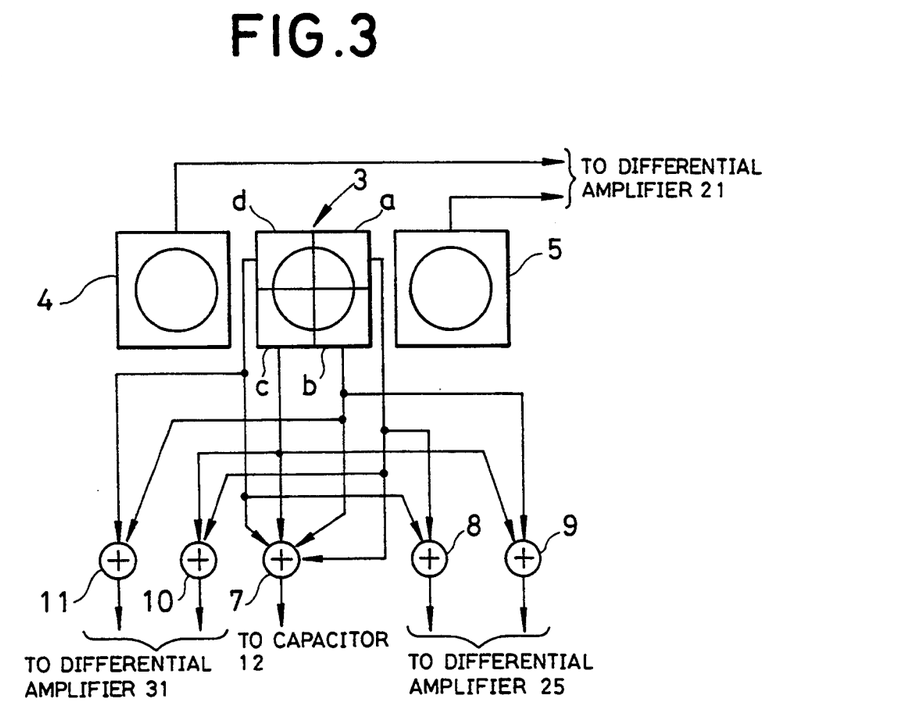
FIG. 3 is a diagram showing a photo-detecting section of a pickup in an apparatus of FIG. 2.

In an optical disc apparatus according to the invention shown in FIG. 2, an optical pickup 1 is used for recording or reproducing a signal and has a semiconductor laser (not shown). A laser beam emitted from the semiconductor laser is irradiated to a disc 2. The semiconductor laser of the pickup 1 is driven by a laser driving circuit 52. A signal to be recorded is supplied to the laser driving circuit 52 through a modulating circuit 51. The optical pickup 1 has a photodetector to receive the reflected light from the disc 2. As shown in FIG. 3, the photodetector comprises three detecting sections 3, 4, and 5 in correspondence to three beams of the three-beam system. The detecting section 3 is divided into four regions and receives the reflected light of a main beam. Each of the detecting sections 4 and 5 receives the reflected light of a sub beam. Each of the divided regions (a) to (d) of the detecting section 3 and the detecting sections 4 and 5 is constructed by a photodiode. A current flowing in each photodiode is detected as a voltage by a current/voltage converter (not shown).

The total voltage of the output voltages of the four divided regions (a to d) of the detecting section 3 is detected by an adder 7. The total voltage of the output voltages of the divided regions (a and d) is detected by an adder 8. The total voltage of the output voltages of the divided regions (b and c) is detected by an adder 9. The total voltage of the output voltages of the divided regions (a and c) is detected by an adder 10. The total voltage of the output voltages of the divided regions (b and d) is detected by an adder 11. A capacitor 12 is connected to an output of the adder 7. The capacitor 12 supplies only the AC component of the output signal of the adder 7 to an RF amplifier 13. An output RF signal of the RF amplifier 13 is supplied to an HPF (high pass filter) 14, from which only a video signal band component is derived and supplied to a demodulating circuit 15. The video signal demodulated by the demodulating circuit 15 is supplied to a change-over switch 19 and is converted into the digital video data by an A/D converter 16. After that, the digital video data is supplied to a memory controller 17. The memory controller 17 controls the writing and reading operations of the data into/from an image memory 18. The image memory 18 comprises an FIFO (First-In First-Out) and has a capacity to store the video signal of one frame. The video data read out from the image memory 18 is supplied from the memory controller 17 to a D/A converter 20. The D/A converter 20 converts the video data into the analog video signal. The change-over switch 19 selectively supplies either one of the video signal demodulated by the demodulating circuit 15 and the video signal converted by the D/A converter 20 to a display apparatus.

The output voltages of the detecting sections 4 and 5 are supplied to a differential amplifier 21. An output signal of the differential amplifier 21 becomes a tracking error signal of the three-beam system. A tracking servo circuit 23 is connected to an output of the differential amplifier 21 through a change-over switch 22. The tracking servo circuit 23 drives a tracking actuator 24 in accordance with the tracking error signal which is supplied.

The output voltages of the adders 8 and 9 are supplied to a differential amplifier 25. An output signal of the differential amplifier 25 is converted into digital data by an A/D converter 26. After that, the digital data is supplied to a memory controller 27. The memory controller 27 controls the writing and reading operations of the data into/from a memory 28. The data read out from the memory 28 by the memory controller 27 is converted into the analog data by a D/A converter 29. After that, the analog data is supplied to a differential amplifier 30. The differential amplifier 30 subtracts the output signal of the D/A converter 29 from the tracking error signal directly supplied from the differential amplifier 25. An output signal of the differential amplifier 30 is supplied to the change-over switch 22 as a tracking error signal of the push-pull system. The change-over switch 22 selectively relays either one of the tracking error signal of the three-beam system and the tracking error signal of the push-pull system to the tracking servo circuit 23.

The output voltages of the adders 10 and 11 are supplied to a differential amplifier 31. An output signal of the differential amplifier 31 becomes a focusing error signal. A focusing servo circuit 32 is connected to an output of the differential amplifier 31. The focusing servo circuit 32 drives a focusing actuator 33 in accordance with the focusing error signal which is supplied.

A DC amplifier 35 is connected to the output of the adder 7. A microcomputer 37 is connected to an output of the DC amplifier 35 through an A/D converter 36. First to third level holding circuits 38 to 40 and first to third comparing circuits 41 to 43 are connected to an output of the DC amplifier 35. The holding operations of the level holding circuits 38 to 40 are controlled by the microcomputer 37. Holding outputs of the level holding circuits 38 to 40 are supplied to the corresponding comparing circuits 41 to 43. Comparison outputs of the comparing circuits 41 to 43 are supplied of the microcomputer 37.

The microcomputer 37 is a system controller and controls the switching operations of the change-over switches 19 and 22 by a control operation, which will be explained hereinbelow. The microcomputer 37 supplies a track jump instruction signal to the tracking servo circuit 23 and controls the operation of a slider driving circuit 46 to drive a slider motor 45 to move the whole pickup 1 in the radial direction of the disc 2. The slider driving circuit 46 drives the slider motor 45 in accordance with a driving signal level of the tracking actuator 24. A display 47 is connected to the microcomputer 37.

A spindle motor 48 to rotate the disc 2 is driven by a spindle driving circuit 49° The spindle driving circuit 49 drives the spindle motor 48 in accordance with a sync signal at which an output signal of the demodulating circuit 15 is separated and extracted by means (not shown). The rotation of the spindle motor 48 is detected by a rotation detector 50. The rotation detector 50 generates a pulse signal each time the spindle motor 48 rotates one and supplies the pulse signal to the memory controller 27.

Figure 4:
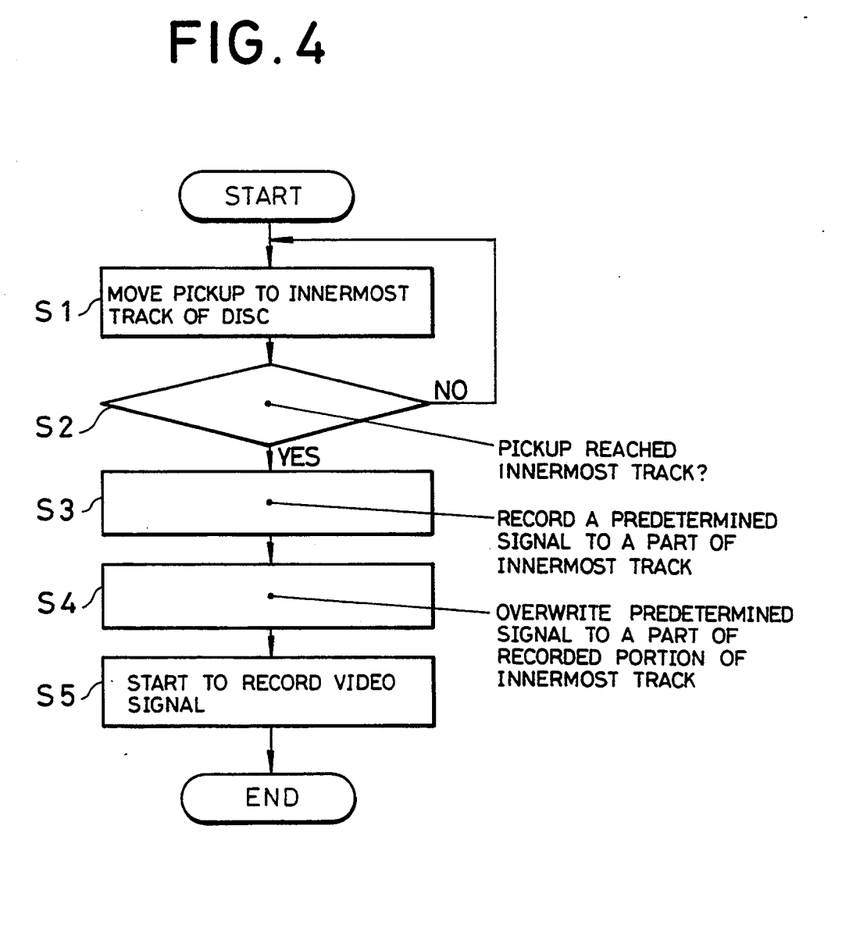
FIG. 4 is a flowchart showing the operation of a microcomputer in the apparatus of FIG. 2.

In such a construction, when a desired video signal is recorded to the disc 2, the microcomputer 37 first generates a command to move the pickup 1 to the innermost track of the disc 2 to the slider driving circuit 46 as shown in FIG. 4 (step S1). A check is made to see if the pickup 1 has reached the innermost track or not (step S2). When the pickup 1 reaches the innermost track, after the elapse of a first predetermined time, the operation to record a predetermined signal for only a second predetermined time is instructed (step S3). Each of the driving circuits, the servo circuits, and the like, consequently, operates and the predetermined signal is recorded to only a part of the innermost track. In this instance, since the DC level by the reflected light of the laser beam is supplied as a digital value to the microcomputer 37, the driving level of the laser driving circuit 52 is controlled in order to control a power of laser beam which is irradiated from the semiconductor laser in accordance with the digital value. As such a predetermined signal, a signal to perform the mere irradiation of the laser beam or a random signal can be also used.

After completion of the execution of step S3, the microcomputer 37 instructs the operation to record a predetermined signal to a part of the recording portion of the innermost track (step S4). That is, the signal is overwritten to a part of the recording portion of the innermost track formed by the execution of step S3. The recording operation, consequently, is executed for a period of time shorter than the second predetermined time. Three portions of the unrecorded portion, recorded portion, and overwritten portion are sequentially formed on the innermost track from its start point. After completion of the execution of step S4, the start of the recording of a desired video signal is instructed (step S5).

Figure 5:
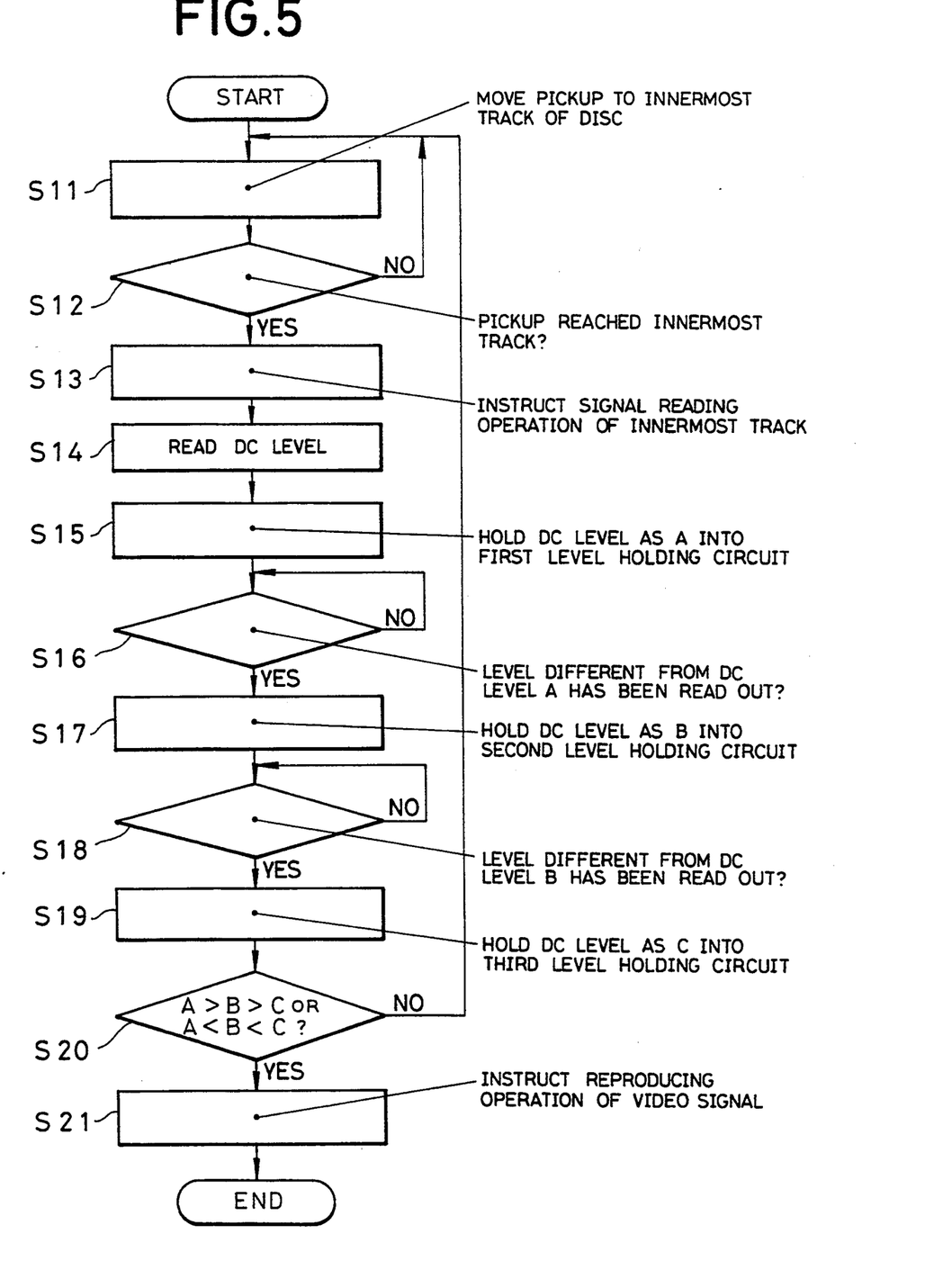
FIG. 5 is a flowchart showing the operation of the microcomputer in the apparatus of FIG. 2.

In the case where the signal has been recorded on the disc 2 as mentioned above, in the signal reproducing operation from the disc 2, the microcomputer 37 first generates a command to move the pickup 1 to the innermost track of the disc 2 to the slider driving circuit 46 as shown in FIG. 5 (step S11). A check is made to see if the pickup 1 has reached the innermost track or not (step S12). When the pickup 1 reaches the innermost track, the reading operation of the signal of the innermost track is instructed (step S13).

The microcomputer 37 reads out and samples the output DC level of the DC amplifier 35 from the output value of the D/A converter 36 at every predetermined timing (step S14). In this instance, the sampled DC level is held as an unrecorded portion level A into the first level holding circuit 38 from the start point of the innermost track (step S15). A check is subsequently made of see if a DC level different from the DC level A has been sampled or not (step S16). When there is a level change, such a DC level is held as a recorded portion level B into the second level holding circuit 39 (step S17). A check is further made to see if a DC level different from the DC level B has been sampled or not (step S18). When there is a level change, such a DC level is held as an overwritten portion level C into the third level holding circuit 40 (step S19). After the DC levels A, B, and C were obtained, a check is made to see if there is a relation of $A>B>C$ or $A<B<C$ among those DC levels or not (step S20). When none of the above relations exists among the DC levels A, B, and C, it is regarded that the sampling operation is wrong, so that the processing routine advances to step S11 and the above operations are again executed. When there is the relation of $A>B>C$ or $A<B<C$ among the DC levels, the reproducing operation of the video signal is instructed (step S21). There is the relation of $A>B>C$ in case of a disc such that when the signal is recorded, a reflectance of the recorded portion decreases. There is the relation of $A<B<C$ in case of a disc such that a reflectance of the recorded portion increases. For example, there is the relation of $A>B>C$ in case of a CD-R.

In the reproducing operation, the read RF signal generated from the pickup 1 is supplied to the HPF 14 through the capacitor 12. Only the video signal band component is derived from the HPF 14 and supplied to the demodulating circuit 15. The video signal demodulated by the demodulating circuit 15 is supplied to the display apparatus through the change-over switch 19. The demodulated video signal is converted into the digital video data by the A/D converter 16 and supplied to the memory controller 17. The memory controller 17 sequentially designates write addresses in the image memory 18 in response of a horizontal sync signal and a vertical sync signal which were separated by a sync separating circuit and writes the video data to the storing positions of the write addresses. The memory controller 17 also sequentially designates read addresses and reads out the video data from the read addresses and supplies to the D/A converter 20. The D/A converter 20 converts the video data into the analog video signal and supplied to the change-over switch 91. The switch 19 is ordinarily in a state in which the video signal demodulated by the demodulating circuit 15 is relayed as it is.

In the case where the signal is read out from the recorded portion upon reproduction, the output DC level of the DC amplifier 35 is equal to the level held in the level holding circuit 39, so that an output of the comparing circuit 42 is set to the high level indicative of the coincidence of the DC level. Since the microcomputer 37, consequently, switches the change-over switch 22 to the output side SA of the differential amplifier 21, the tracking servo operation of the three-beam system is executed. That is, the voltages by the reflected lights of the sub beams which are obtained from the detecting sections 4 and 5 of the pickup 1 are supplied to the differential amplifier 21. A tracking error signal as an output signal of the differential amplifier 21 is supplied to the tracking servo circuit 23 through the switch 22. The tracking servo circuit 23 drives the tracking actuator 24 in accordance with the tracking error signal which is supplied.

Figure 6:
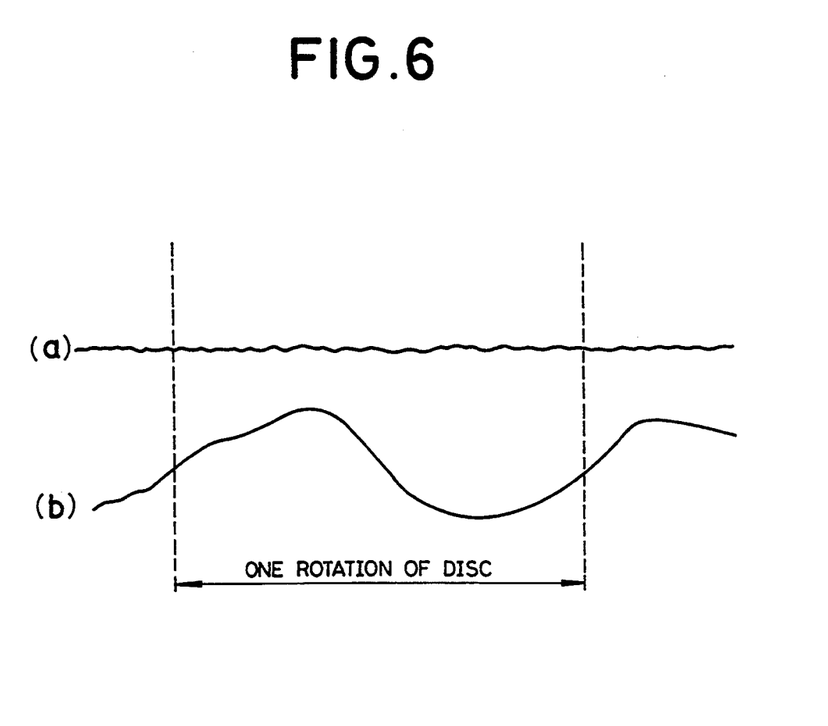
FIG. 6 is a diagram showing a waveform of each tracking error signal.

On the other hand, the (a+d) component and the (c+b) component as output voltages of the adders 8 and 9 by the divided regions (a to d) of the detecting section 3 to receive the reflected light of the main beam are supplied to the differential amplifier 25. The output signal ((a+d) component−(c+b) component) of the differential amplifier 25 is converted into the digital data by the A/D converter 26 and, after that, the digital data is supplied to the memory controller 27. Since a pulse signal is supplied from the rotation detector 50 to the memory controller 27 each time the spindle motor 48 rotates once, the output signal of the differential amplifier 25 for a period of time from the generation of one pulse signal to the generation of the next pulse signal is sequentially written into the memory 28. The output signal of the differential amplifier 25 relates to a residual error component due to an eccentricity of the disc 2. For example, when the tracking error signal of the three-beam system is stable as shown by the curve (a) in FIG. 6, the output signal of the differential amplifier 25 periodically change due to the residual error component as shown by the curve (b) in FIG. 6.

When the unrecorded portion of the disc 2 is read, since the output DC level of the DC amplifier 35 is equal to the level held in the level holding circuit 38, the output of the comparing circuit 41 is set to the high level indicative of the coincidence of the DC level. The microcomputer 37, therefore, switches the change-over switch 22 to the output side SB of the differential amplifier 30, so that the tracking servo operation of the push-pull system is performed. In the tracking servo operation, the digital data of the residual error component due to the disc eccentricity is read out from the memory 28 by the controller 27 synchronously with the pulse signal from the rotation detector 50 and supplied to the D/A converter 29. The D/A converter 29 converts the digital data into the analog data and supplied to the differential amplifier 30. The differential amplifier 30 subtracts the read-out residual error component from the output signal of the differential amplifier 25 and supplied the result to the tracking servo circuit 23 as a tracking error signal through the switch 22. The tracking actuator 24, accordingly, is driven by the tracking servo circuit 23 and the tracking servo operation of the push-pull system is executed.

Upon reproduction from the recorded portion, the microcomputer 37 switches the change-over switch 19 to the output since SC of the demodulating circuit 15. Upon reproduction from the unrecorded portion and the overwritten portion, the microcomputer 37 switches the switch 19 to the output side SD of the D/A converter 20. Therefore, upon reproduction from the recorded portion, the video signal demodulated by the demodulating circuit 15 is directly supplied to the display apparatus as mentioned above. Upon reproduction from the unrecorded portion and overwritten portion, the video data read out from the image memory 18 is converted into the analog video signal by the D/A converter 20 and, after that, the analog video signal is supplied to the display apparatus. That is, upon reproduction from the unrecorded portion and overwritten portion, since the video signal indicative of a video image is not obtained or is not correctly derived from the demodulating circuit 15, the video signal is obtained from the image memory 18. When the unrecorded portion is reproduced, it is also possible to supply the track jump instruction signal to the tracking servo circuit 23 and thereby to allow the pickup to promptly reach the recorded portion. Further, the microcomputer 37 allows the display 47 to display a message indicative of the reproducing mode of either one of the unrecorded portion, recorded point, ad overwritten portion in accordance with the output levels of the comparing circuits 41 to 43.

In the above embodiment, the unrecorded portion, recorded portion, and overwritten portion have been formed on the innermost track. In case of a CD-R, however, those portions can be also formed in a PCA region. The region to form those portions are not limited to the innermost track but those portions can be also formed on another predetermined track on the disc. In the above embodiment, although explanation has been made to an operation that the switching to the push-pull system is performed at the unrecorded portion, the switching to the push-pull system can be performed when a deviation of the pickup from the track has occurred during the reproduction by the three-beam system. Also the switching to the push-pull system can be performed when the recording operation is performed at the unrecorded portion. Although the detection of the recorded portion and the unrecorded portion is discriminated by the DC level in the above-embodiment, the unrecorded portion can be also discriminated by the existence of the video signal, existence of the tracking error signal of the three-beam system, a track traverse signal, or the like.

According the optical disc apparatus of the invention as mentioned above, the comparing means discriminates whether the reading portion of the pickup is the portion corresponding to either one of the recorded portion and the unrecorded portion from the signal level read out from a region other than the predetermined region of the disc by the pickup, and the tracking servo operation is switched of either one of the three-beam system and the push-pull system in accordance with the result of the discrimination. The stable tracking operation, accordingly, can be obtained even in any one of the regions of the recorded portion and the unrecorded portion of the disc. Therefore, when the pickup reaches the unrecorded portion during the recording of the information signal, it is possible to prevent the loss of position control of the beam spot.

What is claimed is:

1. An optical disc apparatus for recording an information signal to an optical disc and for reproducing the recorded information signal, comprising:
   recording means for recording a level setting signal indicative of a recording level into a predetermined region of the disc when the information signal to be recorded is recorded on the disc;
   memory means for reading out the level setting signal from said predetermined region by a pickup and storing when the information signal recorded on the disc is reproduced;
   comparing means for comparing a signal level read out from a region other than said predetermined region of the disc by said pickup and the level setting signal stored in said memory means; and
   tracking servo means for selectively performing a tracking servo operation of either one of a three-beam system and a push-pull system operative in accordance with the result of the comparison by the comparing means.

2. An apparatus according to claim 1, wherein a predetermined information signal is generated when said comparing means generates the comparison result indicating that the signal level which has been read out does not coincide with the level setting signal stored in said memory means.

* * * * *